United States Patent [19]

Neer et al.

[11] 4,088,881
[45] May 9, 1978

[54] LIGHTING FIXTURE

[75] Inventors: Donald A. Neer; Harold D. Pawlowski, both of Urbana, Ohio

[73] Assignee: Midland-Ross Corporation, Cleveland, Ohio

[21] Appl. No.: 676,221

[22] Filed: Apr. 12, 1976

[51] Int. Cl.² ............................................. B60Q 3/02
[52] U.S. Cl. .................................... 362/223; 40/574; 40/575
[58] Field of Search .................. 240/7.25, 7.35, 2 AD; 40/129 R, 132 R, 130 R

[56] References Cited

U.S. PATENT DOCUMENTS

| 1,988,429 | 1/1935 | Koch | 40/132 R |
|---|---|---|---|
| 2,587,807 | 3/1952 | Arenberg | 240/7.35 |
| 3,035,161 | 5/1962 | Kalt | 240/7.35 |
| 3,210,875 | 10/1965 | Schwenkler | 40/132 R |
| 3,211,904 | 10/1965 | Schwenkler | 40/132 R |
| 3,562,942 | 2/1971 | Mabrey | 40/132 R |

Primary Examiner—Monroe H. Hayes
Attorney, Agent, or Firm—Biebel, French & Nauman

[57] ABSTRACT

A lighting fixture for attachment to the ceiling of public transportation vehicles such as subway cars, buses, aircraft, or the like includes a light transmitting cover assembly which is particularly adapted to retain and back light low cost sheets of advertising material, such as material printed on vellum or thin paper, while also accommodating conventional car cards or transparencies. The fixture further provides a pivotal mounting arrangement along one marginal edge which provides ease of installation with vehicles of varying ceiling contour.

7 Claims, 7 Drawing Figures

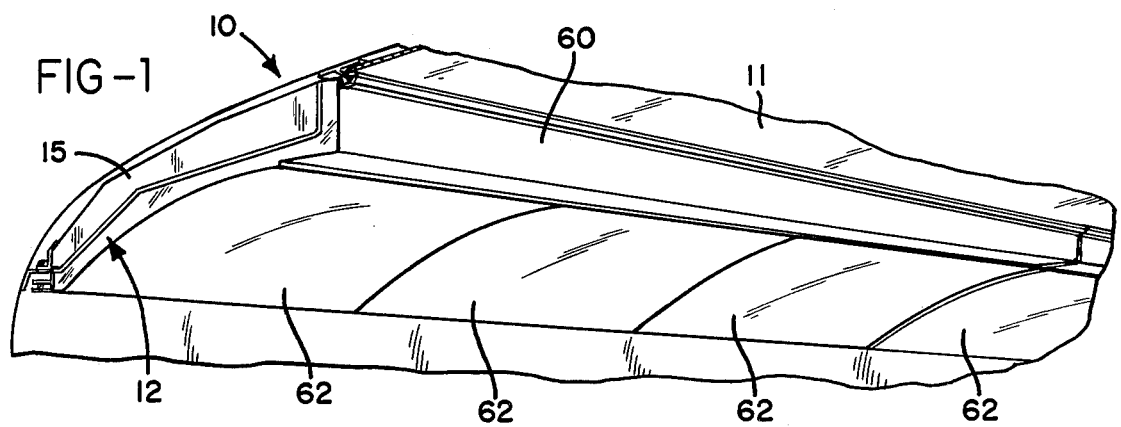
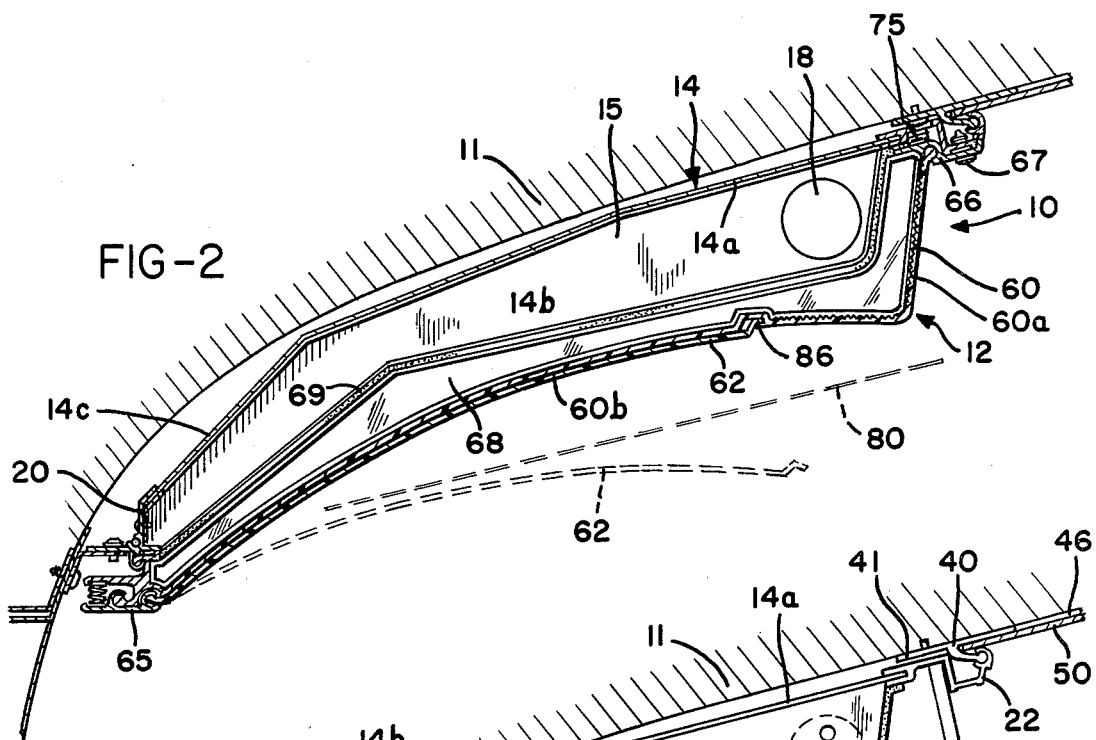
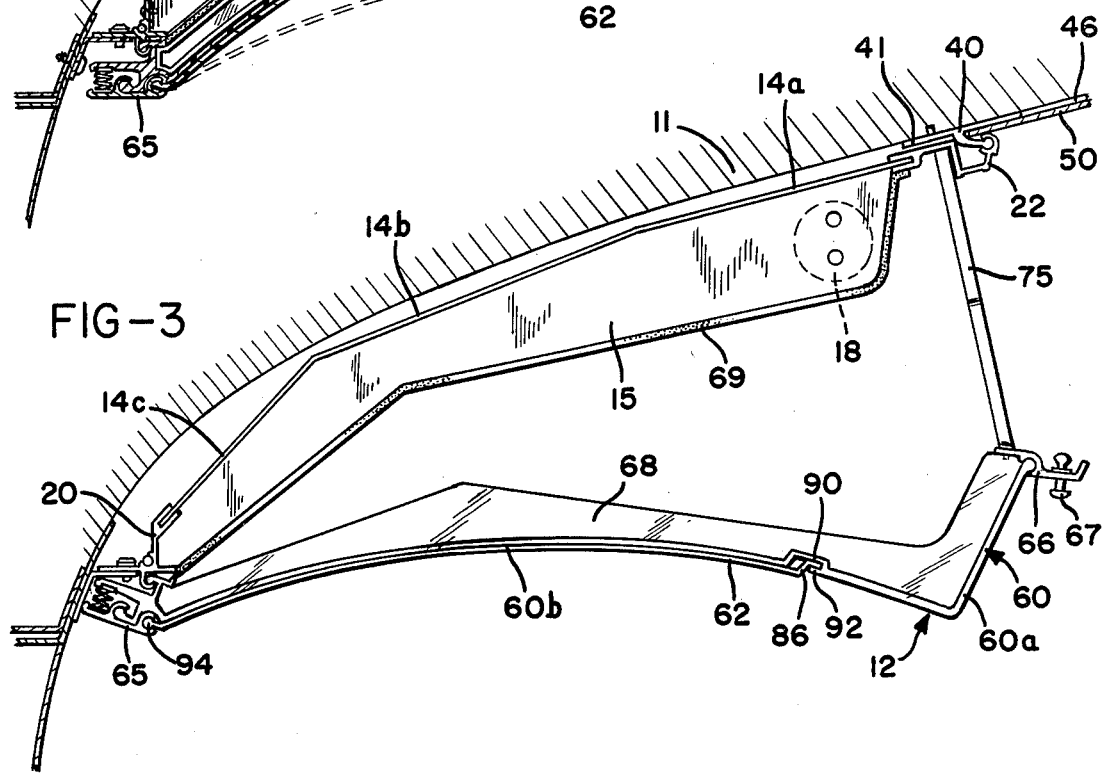

U.S. Patent   May 9, 1978   Sheet 2 of 2   4,088,881
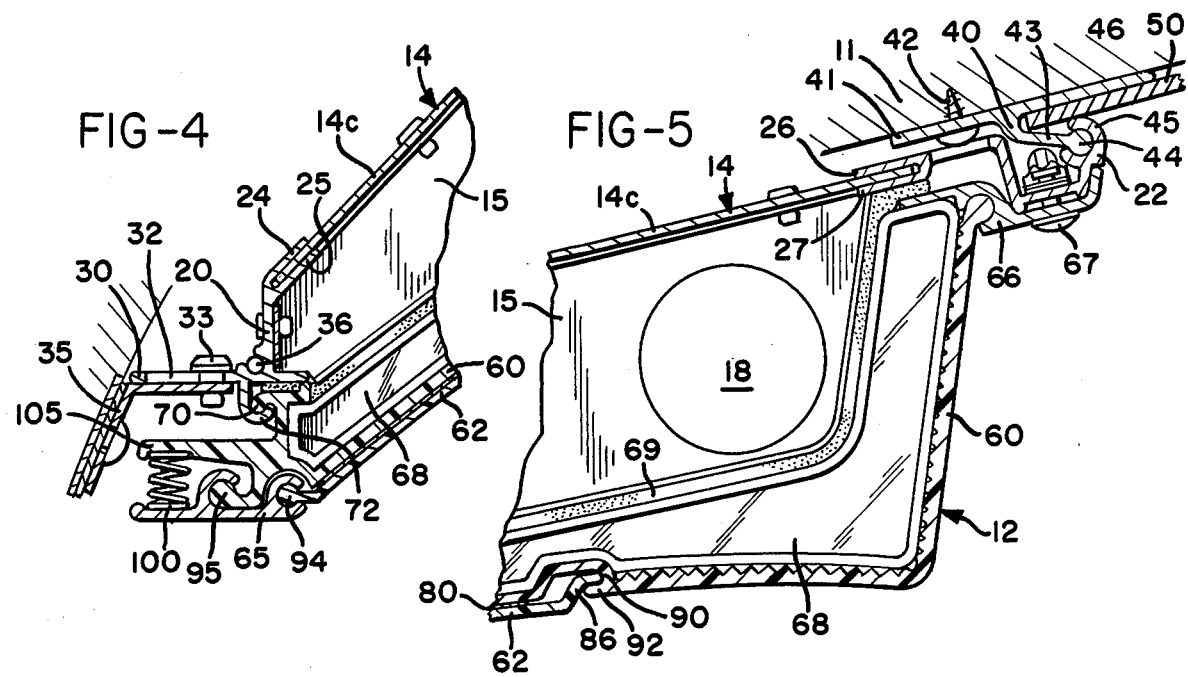
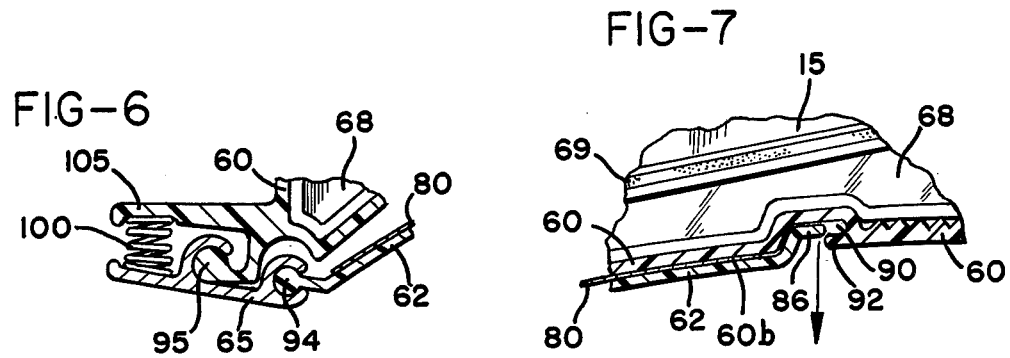

LIGHTING FIXTURE

BACKGROUND OF THE INVENTION

Lighted ceiling fixtures for buses, coaches, subway cars, transit vehicles and the like have come into use which provide the dual function of interior illumination as well as back lighting a translucent advertising card. Such units are shown for example, in the U.S. Pat. Nos., of Jayne, 2,336,016 of 1943 and Schwenkler, 3,210,875 and 3,211,904, both of 1965, and are commonly provided with a light-transmitting cover which has inwardly turned flanges within which relatively stiff printed advertising cards are received for back lighting.

The advertising cards which have commonly been used with back-lighted fixtures are normally transparencies which are silk-screened on both sides of du Pont Mylar sheets or similar relatively heavy transparent plastic material of 0.010 inch thickness or greater. Such relatively heavy material is required so that the cards are self-retaining when supported only at the edges, and silk screening is commonly required on both the front and the back surfaces to prevent pin holes. Such advertising cards are commonly 11 × 21 inches or 11 × 28 inches in size and may cost about $1.85 each in four colors in large quantities of about one thousand. When they are back lighted they provide an attractive and eye-catching advertising display.

It has long been recognized that advertising copy can more economically be printed on ordinary board-type paper in local printing shops. However, when such material is printed on cardboard, it does not transmit any light when back lighted and when such advertising material is used in back-lighted fixtures, as it often is, there is obviously no back-lighted effect. However, cardboard type cards are often used in front lighted fixtures of the type shown, for example, in the U.S. Pat. No. of Arenberg, 2,587,807 of 1952.

SUMMARY OF THE INVENTION

The present invention permits the back lighting of even lower cost advertising material. Local printing shops can print advertisements on translucent paper stock such as vellum or thin paper. The cost of such advertising material may run approximately $.16 a sheet, depending on quantity, in the standard 11 × 28 inches size, thereby providing a substantial savings over the heavier and more costly color transparencies. A translucent fixture cover is provided with a transparent flexible overlying sheet which conforms substantially to the surface of the translucent cover and which retains the thin and low cost advertising copy in sandwiched relation between the retaining sheet and the cover. In the preferred embodiment, such transparent retaining sheet is biased in a latch position in a manner which urges the transparent sheet against the cover and tends to retain the sheet in a closed advertising copy retaining position.

A further feature and object of the invention resides in the adaptability of the lighting fixture to ceiling or roof curvatures of varying contour. Public transportation vehicles, such as buses, transit cars, aircraft and the like are known to have ceiling contours which are not uniform throughout the longitudinal length of the vehicle and accordingly, the invention provides a pivot or hinge arrangement between one of the mounting rails and the fixture along one longitudinal edge, and further provides a slotted fastener arrangement along the opposite longitudinal edge. These permit end-to-end alignment of the fixtures and provide for compensation of variations in ceiling contours. Alignment of the fixtures is further facilitated by the use of alignment pins or keys between adjacent fixtures.

An important object of the invention is to provide an attractive low cost transmit lighting fixture for interior illumination and for back lighting ads which is particularly adapted to employ low cost advertising copy.

Another object of the invention is the provision, in a public transportation ceiling lighting fixture, of an advertisement retaining overlay which is associated with the light transmitting cover and which effectively captures the advertising copy between it and the light transmitting cover, thus providing for the use of advertising copy printed on ordinary paper.

A further object of the invention is the provision of a lighting fixture as outlined above employing a transparent ad retaining overlie or retainer which has one edge received within an integral slot formed in the light transmitting cover and which is pivoted along an opposite marginal edge. In the preferred embodiment, the pivotally mounted edge is retained in an actuating lever, and spring means biases the lever in a direction tending to urge the sheet firmly against the light transmitting cover and into latching relation with the integral slot.

A still further object is the provision of a lighting fixture as defined in the preceding paragraph in which the light transmitting cover and the transparent ad retainer form a cover assembly, which assembly is, in turn, pivotally attached to the lighting fixture along one marginal edge remote from the inner light source, permitting the assembly to be pivoted away from the fixture backing, providing ease of access to the light source for replacement of the fluorescent tube or the like.

These and other objects and advantages of the invention will be apparent from the following description, the accompanying drawings, and the appended claims.

BRIEF DESCRIPTION OF THE DRAWINGS

FIG. 1 is a perspective view of a ceiling portion of a transit vehicle showing a lighting fixture according to this invention;

FIG. 2 is a transverse section through the fixture of FIG. 1 with the transparent ad retaining sheet being shown in the open position by broken lines;

FIG. 3 is an end elevation of the fixture of FIG. 1 showing the light transmissive cover assembly in the open position for replacement of the fluorescent tube;

FIG. 4 is an enlarged fragmentary cross-sectional view showing the details of the lighting fixture adjacent the back mounting rail;

FIG. 5 is a similar enlarged fragmentary cross-sectional view showing the details of the fixture adjacent the front or upper mounting rail;

FIG. 6 is a fragmentary enlarged section showing the operator or lever mechanism for supporting the transparent retainer when the lever is depressed to change the advertising copy; and FIG. 7 is an enlarged fragmentary detail showing the manner in which the retainer sheet is received within the capturing recess in the light transmissive cover.

DESCRIPTION OF THE PREFERRED EMBODIMENT

Referring to the figures of the drawings, a lighting fixture constructed in accordance with this invention is illustrated generally at 10 in FIGS. 1 and 2 as being mounted to the ceiling structure 11 of a transit vehicle. The fixture is particularly adapted to be mounted along a curved ceiling structure, which may be formed of sheet material or which may consist of a series of transversely-extending, longitudinally spaced ceiling ribs or spars.

The lighting fixture itself is formed in two major components, including a light transmissive panel or cover assembly 12, and a metal housing forming an internally, reflective back 14. The back 14 supports a pair of flanged metal end caps 15 which form the end closures of the fixture 10 and which support therebetween an elongated fluorescent tube 18 in a conventional manner. The inside surfaces of the back 14 and the caps 15 are conventionally painted a reflective white.

The back 14 is formed in a somewhat curved configuration to conform to the curved ceiling structure 11, and is preferably formed in three straight sections 14a, 14b and 14c, joined so as to approximate a curve. The longitudinal edges of the back are supported and captured respectively at a back mounting rail 20 (FIG. 4) and an upper or front retainer rail 22 (FIG. 5). The rails 20 and 22 are preferably formed as aluminum extrusions. Rail 20 includes a pair of gripping flanges 24 and 25 which receive the rear marginal edge of the back 14 while rail 22 also has a pair of gripping flanges 26 and 27 which receive the forward marginal edge of the back 14. Thus the edges of the back 14 are retained between the gripping flanges by roll forming or pressing the respective flanges together after the back 14 has been inserted in place, and in this manner an effective connection of the back on the mounting rails is made without the necessity for using rivets, screws or the like.

The back mounting rail 20 is provided with an inwardly directed mounting flange portion 30 which is provided with a plurality of transversely elongated slots 32 which receive headed fasteners 33. An angle or generally L-shaped rear mounting bracket 35 may be suitably attached to the vehicle ceiling 11 and provides support for the flange portion 30 while the slots 32 permit adjustment and alignment of the fixtures 10 to the ceiling structure. Alignment between adjacent fixtures 10 is assured by alignment pins 36 captured within the extruded rail 20 and extending to the corresponding rail 20 of the adjacent fixture.

The retainer rail 22 at the forward edge of the fixture 10 is pivotally retained on an extruded aluminum forward mounting bracket 40. The bracket 40 is flanged rearwardly at 41 to receive fasteners 42 extending into the ceiling or rib 11, and is provided with a downwardly extending web 43 terminating in a bead 44. The retainer rail 22 is extruded with a retainer eye portion 45 which encircles the bead 44 and provides for alignment by reason of pivotal movement of the rail 22 about the bead 44. A slight space is provided between the eye 45 and a forwardly extending flange portion 46 of the brackets 40 to receive and capture therebetween a decorative ceiling panel 50, as shown in FIG. 5. This arrangement thus provides means for capturing and supporting a ceiling panel providing a neat and attractive appearance at the forward edge of the fixture free of any visible fasteners.

The upper or forward mounting bracket 40 not only supports the individual fixtures 10 along the forward marginal edge, it provides for adjustment or angular alignment of the fixture with respect to the curvature of the vehicle ceiling 11. Since the bracket 40 is of a generally T-section, it gives strength to support the fixture 10 in the span areas between longitudinally spaced vehicle roof ribs or trusses, and also provides for a longitudinal capturing and support of typical ceiling decorative panels 50.

Similarly, the connection between the extruded mounting bracket 35 and the mounting flange portion 30 of the back rail 20 provides an effective support as well as a longitudinal closure. This could be important in instances where the area or region behind the fixture 10 is employed as an air channel or duct with the back wall 14 of the fixture forming one closure wall of the duct.

The translucent cover assembly 12 includes an extruded translucent, light-transmissive plastic panel 60, a series of semi-flexible transparent ad sheet retainers 62, and an operating lever 65 for each retainer 62. The lighting fixture 10 is preferably formed in 4, 6 or 8 foot sections to make economical use of fluorescent lamps. However, the retainers 62 are preferably made in two foot sections and positioned in longitudinal side-by-side relation for ease of handling and changing individual ad cards.

The forward region of the panel 60 is retained within an extruded aluminum strip 66 (FIG. 5) which carries a plurality of quick disconnect fasteners 67 which engage the retainer rail 22. The panel 60 is provided with translucent end panels 68 (FIG. 3) having inner edges conforming generally to the shape of the end caps 15. The end caps are provided with a dust seal in the form of urethane tape 69 which engages the marginal edges of the end caps 68 when the cover assembly 12 is in the closed position.

The rear edge of the cover 60, as shown in FIG. 4, is provided with a bead 70 received within a suitable retaining flange 72 formed on the back mounting rail 20 about which the entire cover assembly 12 pivots between an open position, as shown in FIG. 3, and the closed position as shown in FIGS. 2 and 4. A folding retainer strip 75 may be provided between the strip 66 and the rail 22 to define the maximum open position of the cover assembly 12, as shown in FIG. 3.

The light transmissive cover 60 is preferably formed of translucent white or clear material throughout and is formed with a forward angled or widened section 60a which provides interior illumination from the source 18. The forward section 60a joins a transversely extending curved section 60b providing back illumination for the advertising copy. A typical card or sheet of advertising copy is shown in broken lines at 80 in FIG. 2.

The transparent copy retainers 62 are positioned in overlying relation to the panel section 60b adjacent the front surface of the cover section 60a for retaining sheet-like translucent advertising material such as the advertising card 80 in sandwiched relation between the retainers 62 and the adjacent panel. The retainers 62 are formed of semi-flexible transparent plastic material such as a clear acrylic, and have a forward offset end 86 which is normally received within an integral longitudinal retainer slot 90 formed in the cover 60. The slot 90 defines an inwardly extending lip 92 which receives the offset end 86 substantially as shown in FIG. 5.

The inner or rear marginal edges of the retainers 62 are formed with a bead 94 captured within corresponding extruded aluminum levers 65. The levers 65 are, in turn, pivotally mounted on a bead 95 extruded as part of the cover 60. Spring means in the form of a plurality of wire springs 100, or a wavy spring or the like, are interposed between the levers 65 and a rearward integral extension ledge 105, as best seen in FIGS. 4 and 6. The engagement of any one of the retainer sheets 62 with the slot 90 may be released simply by depressing the associated lever 65 as shown in FIG. 6 resulting in pivotal movement of the lever 65 about the bead 95, thus withdrawing the lower edge of the sheet 62 from engagement with the cover 60 and retracting the offset or retaining portion 86 from within the retaining slot 90, as shown in FIG. 7. The sheet 62 may then be dropped down for insertion or replacement of the advertising sheet 80. When the sheet 80 has been replaced, the lever 65 is released and the spring means 100 urges the retainer 62 firmly against the curvature of the cover portion 60b, and urges the offset end 86 into captured relation within the slot 90.

In summary, the invention permits the use of thin, low cost sheets of advertising copy while, at the same time, permits the use of the former or existing heavy plastic transparencies, as well as cardboard cards. Further, the fixture may be readily aligned when used with differing or varying ceiling contours, thus reducing the cost of installation and reducing the inventory necessary to provide such materials.

While the form of apparatus herein described constitutes a preferred embodiment of this invention, it is to be understood that the invention is not limited to this precise form of apparatus, and that changes may be made therein without departing from the scope of the invention.

What is claimed is:

1. A lighting fixture for a public transportation vehicle such as a bus, subway car or the like for supporting and back lighting translucent advertising material, comprising a housing having an internally reflective longitudinally extending back, a longitudinally extending curved light transmissive panel spaced from said back, tube-like lamp means in said housing between said back and said panel, a transparent flexible sheet positioned in overlying relation to said panel adjacent the front surface thereof for retaining sheet-type translucent advertising material between said sheet and said panel, and lever means pivotally attaching said sheet to said panel along one longitudinal marginal edge of said sheet, and spring means biasing said lever means to urge said sheet against said panel, in conforming relation to the curvature of the panel.

2. The fixture of claim 1 further comprising means for pivotally mounting said fixture to the roof of said vehicle along one marginal edge thereof and means for adjustably mounting the opposite marginal edge thereof to said ceiling to accommodate variations in contour of said ceiling.

3. A lighting fixture for a public transportation vehicle such as a bus, a subway car or the like for supporting and back lighting translucent advertising material, comprising a housing having a reflective longitudinally extending backing, a longitudinally extending light transmissive panel spaced from said backing, said panel having an arcuately curved advertising illuminating section and a vehicle interior lighting section, tube-type lamp means in said housing between said backing and said panel, and a transparent flexible sheet positioned in overlying relation to said advertising illuminating section, means pivotally attaching said sheet at one marginal edge thereof to said panel, and slot means integrally formed in said panel receiving the opposite marginal edge of said sheet, said pivotal attaching means and said slot means retaining said sheet in surface-conforming relation adjacent the front surface of said panel for retaining thin paper-like advertising material sandwiched between said sheet and said panel.

4. A lighting fixture for attachment to the ceiling of a public transportation vehicle such as a bus, a subway car or the like for supporting and back lighting translucent advertising material, comprising a housing having a light reflective back and a pair of longitudinally spaced end caps, a cover assembly enclosing said housing and having a light transmissive translucent cover, elongated lamp means extending between said end caps within said fixture, said cover assembly including a light transmissive panel formed with a transversely arcuate curvature, a plurality of transparent flexible advertisement retaining sheets positioned in longitudinal alignment on said cover panel in the region of the arcuate curvature thereof, slot means in said panel receiving one marginal edge of said sheets, attaching means for securing the opposite marginal edges of said sheets to said cover assembly including a corresponding series of longitudinally aligned actuating levers, one for each one of said sheets, each of said levers being pivotally mounted on said panel and having means gripping the associated one of said sheets at its said opposite marginal edge and operable when pivoted to cause the withdrawal of said one marginal edge from engagement with said panel slot means, said lever normally urging the associated said sheet into conforming relation with the arcuate curvature of said panel and urging the engagement of said one marginal edge with said slot means to retain pages of thin translucent advertising material in sandwiched and supported relation between said sheets and said panel.

5. In a lighting fixture for attachment to a transversely curved ceiling of a public transportation vehicle such as a bus, a subway car or the like, in which a housing has a light reflective back and a pair of longitudinally spaced end caps, light means in said housing extending between said end caps and a light transmissive cover closing said housing, the improvement in fixture mounting comprising a first mounting rail attached to said housing and extending along a forward marginal edge of said housing, and a second mounting rail extending along a rear marginal edge of said housing, a first ceiling mounting bracket pivotally attached to said first mounting rail and having flange means adapted to be attached to the ceiling of said vehicle, a second ceiling mounting brcket adapted to be attached to said second mounting rail and having flange means attaching the same to said ceiling, slotted means in said second mounting rail providing for adjustment in the relative position between said second rail, and said second bracket, said pivotal mounting means and said slotted means permitting mounting of a plurality of said fixtures in longitudinal end-to-end alignment along the length of the vehicle ceiling while providing for variations in ceiling contour.

6. The fixture of claim 5 further comprising means between said first mounting rail and said first mounting bracket defining a longitudinal slot for receiving and capturing the marginal edge of a decorative ceiling panel.

7. A lighting fixture for attachment to the ceiling of a public transportation vehicle such as a bus, a subway car or the like for supporting and back lighting translucent advertising material, comprising a housing having a light reflective back and a pair of longitudinally spaced end caps, a cover assembly enclosing said housing and having a light transmissive panel formed with a transversely arcuate curvature, lamp means within said fixture, at least one transparent flexible advertisement retaining sheet positioned in longitudinal alignment on said panel in the region of the arcuate curvature thereof, means in said panel defining a slot receiving one marginal edge of said sheet, attaching means for securing the opposite marginal edge of said sheet to said cover assembly including a longitudinally aligned actuating lever, means pivotally mounting said lever on said panel, longitudinal means on said lever gripping said sheet at its said opposite marginal edge, said lever operable when pivoted to cause the withdrawal of said one marginal edge from said panel slot, said lever normally urging said sheet into conforming relation with the arcuate curvature of said panel and urging the engagement of said one marginal edge within said slot to retain thin translucent advertising material in sandwiched and supported relation between said sheet and said panel.

* * * * *